(12) United States Patent
Matsuki

(10) Patent No.: US 7,539,222 B2
(45) Date of Patent: May 26, 2009

(54) METHOD OF OPERATING LASER LIGHT SOURCE

(75) Inventor: Kazuto Matsuki, Tokyo (JP)

(73) Assignee: Advanced Mask Inspection Technology Inc., Yokohama-shi (JP)

(*) Notice: Subject to any disclaimer, the term of this patent is extended or adjusted under 35 U.S.C. 154(b) by 5 days.

(21) Appl. No.: 11/278,637

(22) Filed: Apr. 4, 2006

(65) Prior Publication Data

US 2007/0071042 A1 Mar. 29, 2007

(30) Foreign Application Priority Data

Sep. 28, 2005 (JP) ............................. 2005-281108

(51) Int. Cl.
 *H01S 3/10* (2006.01)
(52) U.S. Cl. .......................................... 372/21; 372/22
(58) Field of Classification Search .................. 372/21, 372/22; 356/237.1, 237.2, 239.2
See application file for complete search history.

(56) References Cited

U.S. PATENT DOCUMENTS

| | | | | |
|---|---|---|---|---|
| 6,005,878 | A * | 12/1999 | Kung et al. | 372/22 |
| 6,021,142 | A * | 2/2000 | Lotshaw et al. | 372/21 |
| 6,036,321 | A * | 3/2000 | Wright et al. | 359/513 |
| 6,157,444 | A * | 12/2000 | Tomita et al. | 356/237.1 |
| 6,532,100 | B1 * | 3/2003 | Partanen et al. | 359/326 |
| 2002/0126715 | A1 * | 9/2002 | Gerstenberger et al. | 372/22 |
| 2004/0114134 | A1 * | 6/2004 | Fliss | 356/239.2 |
| 2005/0046832 | A1 * | 3/2005 | Kaller | 356/239.2 |
| 2005/0238069 | A1 * | 10/2005 | Ohkubo et al. | 372/21 |
| 2006/0056470 | A1 * | 3/2006 | Liu et al. | 372/38.1 |
| 2006/0291519 | A1 * | 12/2006 | Buse et al. | 372/68 |

FOREIGN PATENT DOCUMENTS

JP 2003-46173 2/2003

* cited by examiner

*Primary Examiner*—Minsun Harvey
*Assistant Examiner*—Michael Carter
(74) *Attorney, Agent, or Firm*—Oblon, Spivak, McClelland, Maier & Neustadt, P.C.

(57) ABSTRACT

A method of operating a laser light source including a wavelength conversion device in which two wavelength laser beams are input to a nonlinear crystal to output a sum frequency wavelength, according to one embodiment includes inputting only one wavelength laser beam of the two input wavelength laser beams to the nonlinear crystal; measuring scattered light intensity of the one wavelength laser beam by a light sensitive sensor installed on an optical axis of the sum frequency wavelength output beam; and judging a damage state of the nonlinear crystal based on a measurement value obtained of the intensity measurement by the light sensitive sensor.

5 Claims, 8 Drawing Sheets

METHOD OF OPERATING LASER LIGHT SOURCE

CROSS-REFERENCE TO RELATED APPLICATION

This application is based on and claims priority of Japanese Patent Application (JPA) No. 2005-281108, filed on Sep. 28, 2005, the entire contents of which are incorporated herein by reference.

BACKGROUND OF THE INVENTION

1. Field of the Invention

The present invention relates to a method of operating a laser light source for use in various kinds of inspections, measurements, and processes and, more particularly, to a method of operating a laser light source in a deep ultraviolet region using a nonlinear crystal.

2. Description of the Background

Generally, a laser beam has characteristics that since the frequency is higher than that of an electric wave, information storage capacity is large; furthermore, since the wavelength is equal and the phase is uniform, a laser beam is excellent in monochromaticity and directivity and has coherency which is not seen for a normal beam; further, since a laser beam can be extremely narrowly converged, energy is focused on a minute area to realize high temperature and high voltage locally and instantaneously, resulting in application to many fields such as communications and information fields, measurement field, application to process technology, and application to medical field.

In the laser usage where a short wavelength is required, a laser in a deep ultraviolet region is used. However, since there are limitations of a laser medium and an excitation source in the deep ultraviolet region, laser oscillation is difficult. Consequently, as for a laser light source in the deep ultraviolet region, there are many methods which perform wavelength conversion of laser output of visible region from relatively stable near-infrared, in particular a method which uses harmonic generation and sum frequency generation using a nonlinear crystal.

In the case of the harmonic generation, laser output of integral multiple frequency such as frequencies $2\omega$ and $3\omega$, that is, laser output of a wavelength which becomes short to $\lambda/2$ and $\lambda/3$, with respect to an input wavelength $\lambda$, can be obtained by inputting a laser beam of a frequency $\omega$ to a nonlinear optical crystal.

Furthermore, in the case of the sum frequency generation, laser output whose frequency is $c\omega$ ($=\omega 1+\omega 2$), that is, laser output of $\lambda 3$ whose wavelength is shorter than that of either input wavelength $\lambda 1$ or $\lambda 2$ that fulfills a relationship, $1/\lambda 3=1/\lambda 1+1/\lambda 2$, with respect to input wavelengths $\lambda 1$ and $\lambda 2$, can be obtained by inputting a laser beam of two different frequencies $\omega 1$ and $\omega 2$ to the nonlinear crystal.

Naturally, BBO crystal ($BaB_2O_4$) and CLBO crystal ($CsLiB_6O_{10}$), which are nonlinear crystals for use in sum frequency generation and harmonic generation in a deep ultraviolet region, are subject to damages due to light or circumference moisture. Then, damages produced on the nonlinear crystal cause degradation of laser beam output and change in intensity distribution. So, there arises a problem in that measurement accuracy and process quality deteriorate in the inspection, measurement, and process with laser beam.

Consequently, in the case where a nonlinear crystal is generally operated for a long time, a crystal with a certain degree of size is used; and, when damage is produced, the nonlinear crystal is moved so that a non-damaged part is used. Therefore, the nonlinear crystal is installed on a micromotion mechanism. Furthermore, the nonlinear crystal is installed in a space so as to purge circumferential atmosphere and is heated, so as to be at constant temperature, with a heater or the like for preventing it from being damaged due to moisture.

As described above, in the method in which the nonlinear crystal is moved each time the nonlinear crystal is damaged, it is indispensable to judge whether or not damage exists.

For example, an operation method, in which a constant time is set based on the evaluation result separately carried out and the crystal is moved when an operating time of a laser light source exceeds the predetermined time, is adopted. However, since this method generally sets a sufficient margin for damage, the crystal is actually moved regardless of no degradation of laser output; therefore, there is a problem in that operating life of an expensive nonlinear crystal cannot be effectively used. Furthermore, as a result, there arises a problem in that effective use of a laser device cannot be made because maintenance frequency of the laser device increases.

Figure 8:
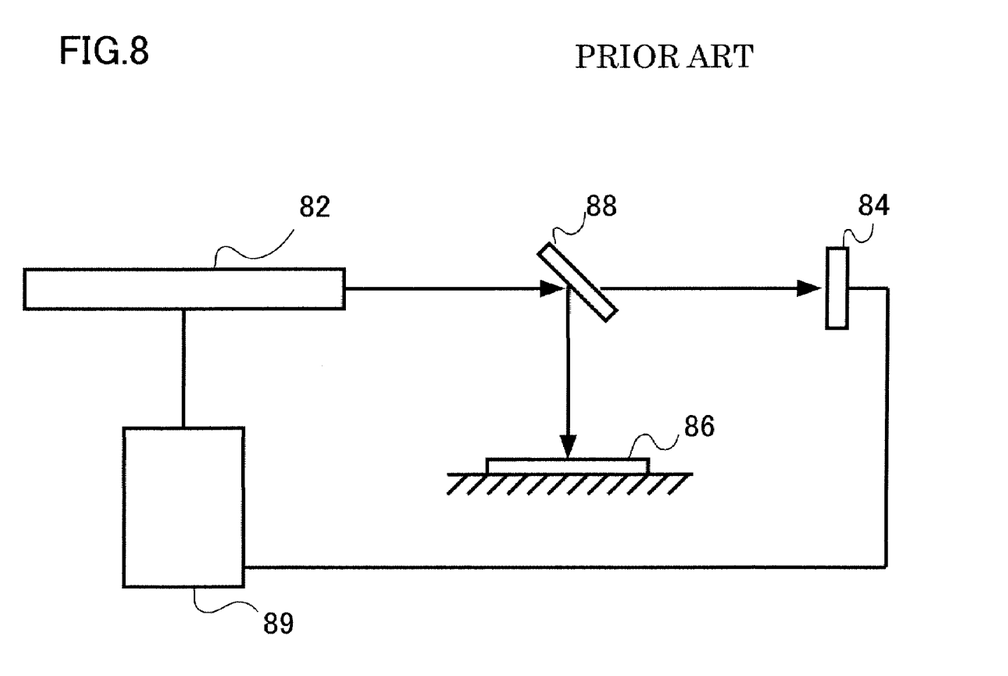
FIG. 8 is a conceptual view showing a configuration of a prior art.

Consequently, in a laser device using a nonlinear crystal, a method, in which a part of laser beam irradiating a workpiece is separated and the separated laser beam is observed to monitor damage of the nonlinear crystal, is disclosed in a document (for example, refer to Japanese Patent Application, Publication No. 2003-46173). FIG. 8 is a configuration view showing a laser device of a prior art. In FIG. 8, a laser beam is output from a laser oscillator 82 by electric power supplied by a laser power supply 89. Then, the laser beam output from the laser oscillator is split by a beam splitter 88. Then, intensity of one laser beam of the split laser beams is measured by a light sensitive sensor 84. Degradation of the laser beam intensity, that is, the presence or absence of damage of the nonlinear crystal is judged by monitoring change in this laser beam intensity.

For a certainty, according to this prior art, damage of the nonlinear crystal for use in the laser oscillator can be monitored by monitoring change in the laser beam output simultaneously with laser processing. However, a scattered light which is generated when the nonlinear crystal is damaged is certainly superimposed on the laser beam output. Therefore, there is a problem in that if degradation of the laser beam due to damage of the nonlinear crystal is equivalent to the order of increase in scattered light, both are offset, so that it becomes truly difficult to judge the presence or absence of damage of the nonlinear crystal.

BRIEF SUMMARY OF THE INVENTION

The present invention has been made in view of the circumstances and an object of the present invention is to provide a method of operating a laser light source capable of accurately monitoring damage of a nonlinear crystal for use in a laser light source and stably providing a laser beam.

A method of operating a laser light source including a wavelength conversion device in which two wavelength laser beams are input to a nonlinear crystal to output a sum frequency wavelength, according to an embodiment of the present invention, comprises:

intermitting stationary use of the laser light source with any interval;

inputting only one wavelength laser beam of the two wavelength laser beams to the nonlinear crystal;

measuring scattered light intensity of the one wavelength laser beam by a light sensitive sensor installed on an optical axis of the sum frequency wavelength output beam; and judging a damage state of the nonlinear crystal based on a measurement value obtained by the measuring.

A method of operating a laser light source including a wavelength conversion device in which two wavelength laser beams are input to a nonlinear crystal to output a sum frequency wavelength, according to an embodiment of the present invention, comprises:

intermitting stationary use of the laser light source with any interval;

inputting only one wavelength laser beam of the two wavelength laser beams to the nonlinear crystal;

measuring scattered light intensity of the one wavelength laser beam by a light sensitive sensor installed on an optical axis of the sum frequency wavelength output beam;

inputting only the other wavelength laser beam different from the one wavelength laser beam to the nonlinear crystal;

measuring scattered light intensity of the other wavelength laser beam by the light sensitive sensor installed on the optical axis of the sum frequency wavelength output beam; and judging a damage state of the nonlinear crystal based on both a measurement result of the scattered light intensity of the one wavelength laser beam and a measurement result of the scattered light intensity of the other wavelength laser beam.

A method of operating a laser light source including a wavelength conversion device having a nonlinear crystal which is a wavelength conversion element and a heater which maintains the nonlinear crystal at a constant temperature, according to an embodiment of the present invention, comprises:

measuring electric power supplied to the heater; and judging a damage state of the nonlinear crystal based on a measurement value obtained by the measurement.

A method of operating a laser light source including a wavelength conversion device having a nonlinear crystal which is a wavelength conversion element and a heater which maintains the nonlinear crystal at a constant temperature, according to an embodiment of the present invention, comprises:

measuring electric power supplied to the heater;

judging a damage state of the nonlinear crystal based on a measurement value obtained by the measurement; and automatically moving the nonlinear crystal so that a laser beam to be input to the nonlinear crystal is received at a non-damaged region of the nonlinear crystal.

According to the present invention, it becomes possible to provide a method of operating a laser light source capable of accurately monitoring damage of a nonlinear crystal for use in a laser light source and stably providing a laser beam.

DETAILED DESCRIPTION OF THE PREFERRED EMBODIMENTS

A method of operating a laser device according to the present invention will be described below based on the accompanying drawings.

First Embodiment

First, as a first embodiment according to the present invention, there will be described a method of operating a laser light source including a wavelength conversion device in which two wavelength laser beams are input to a nonlinear crystal to output a sum frequency wavelength, the method including: a step of intermitting stationary use of the laser light source with any interval; a step of inputting only one wavelength laser beam of the two wavelength laser beams to the nonlinear crystal; a step of measuring scattered light intensity of the one wavelength laser beam by a light sensitive sensor installed on an optical axis of the sum frequency wavelength output beam; and a step of judging a damage state of the nonlinear crystal based on a measurement value obtained by the measurement of the scattered light intensity.

(Device Configuration)

Figure 1:
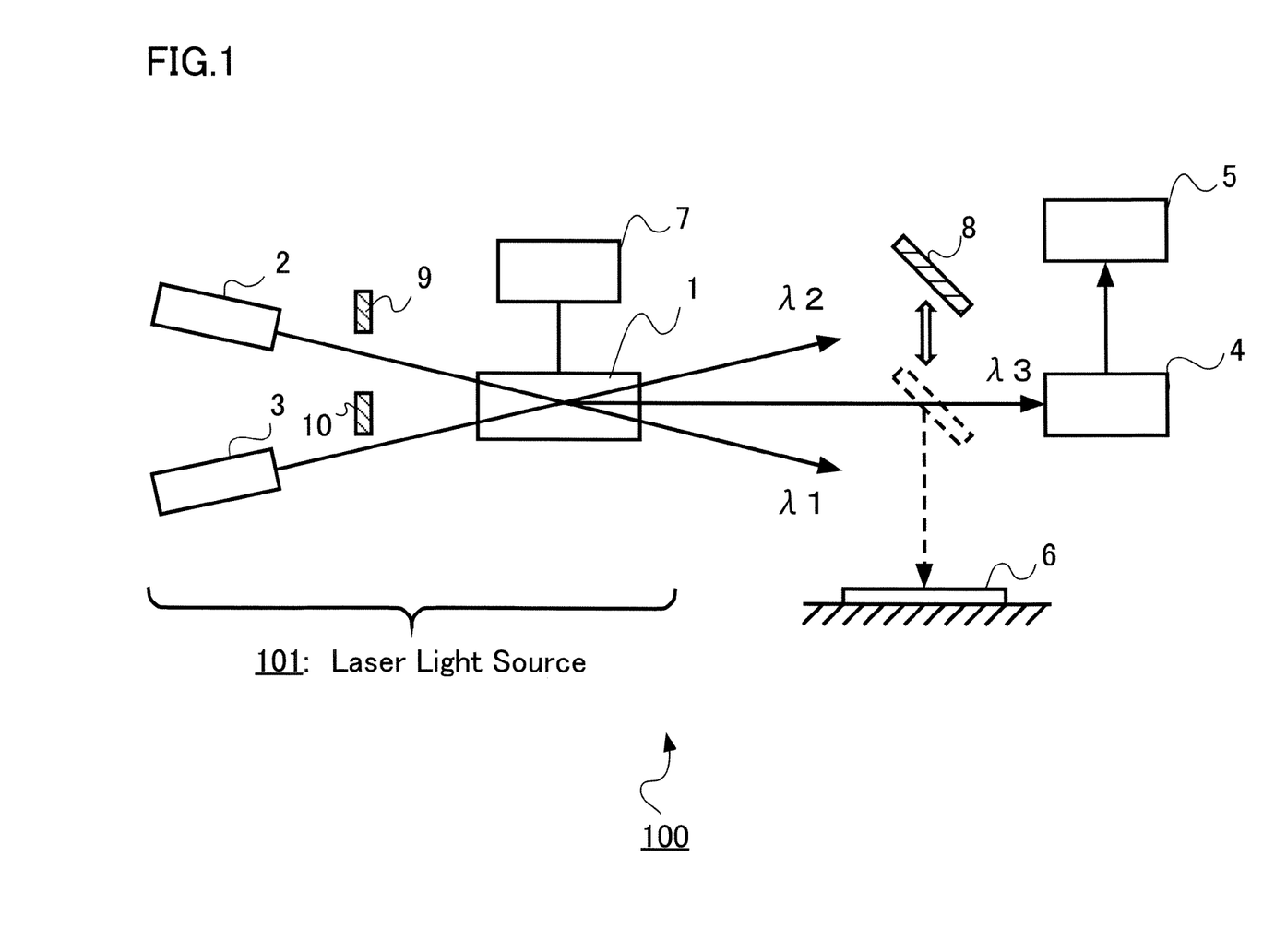
FIG. 1 is a conceptual view showing a configuration of a laser light source operated by an operation method according to a first embodiment and a laser device provided with the light source.

FIG. 1 is a conceptual view showing a configuration of a laser light source operated by an operation method according to the first embodiment and a laser device provided with the light source.

A laser device 100 according to the present embodiment includes a laser light source 101. The laser light source 101 includes a first laser oscillator 2 which generates a $\lambda 1$ wavelength laser beam, a second laser oscillator 3 which generates a $\lambda 2$ wavelength laser beam, a first shutter 9 which blocks the $\lambda 1$ wavelength laser beam output from the first laser oscillator 2, a second shutter 10 which blocks the $\lambda 2$ wavelength laser beam output from the second laser oscillator 3, a nonlinear crystal 1 which is a wavelength conversion element for generating a $\lambda 3$ wavelength laser beam by sum frequency mixture of the input wavelengths $\lambda 1$ and $\lambda 2$, and a micromotion device 7 which moves the crystal when damage is produced on the nonlinear crystal 1.

Furthermore, the laser device 100 according to the present embodiment includes a light sensitive sensor 4 which is disposed on an optical axis of the $\lambda 3$ laser beam output from the laser light source 101, a judging circuit 5 which judges a damage state of the nonlinear crystal based on a measurement value obtained by the light sensitive sensor 4, a sample to be irradiated 6 to which the $\lambda 3$ laser beam output from the laser light source 101 is irradiated, and a movable mirror 8 by which an optical path is changed when the laser beam is irradiated to the sample to be irradiated.

In FIG. 1, component parts unnecessary for explaining the first embodiment are not shown. It goes without saying that the laser device 100 and the laser light source 101 generally include other necessary components.

Here, for example, the first laser oscillator 2 uses a YAG (Yttrium Aluminum Garnet) laser oscillator in which neodymium serves as an active medium, oscillating at wavelength 1064 nm; and, the second laser oscillator 3 uses an argon laser oscillator which generates a harmonic two times of 244 nm. Then, CLBO crystal ($CsLiB_6O_{10}$) is used as the nonlinear crystal 1 of the wavelength conversion element. Consequently, a laser beam output of a wavelength 198.5 nm (=1/(1/1064+1/244)) can be obtained from the laser light source 101 as a sum frequency. If such a laser beam in a deep ultraviolet region is used, for example, when the laser device 100 is a defect inspecting device in which the sample to be irradiated 6 is used as a mask pattern for use in a semiconductor lithography, sufficient resolution characteristic can be obtained even in a mask of 65 nm design rule product which is a next-generation semiconductor product, thereby enabling it as an inspection object.

Here, the first laser oscillator 2 and second laser oscillator 3 are not particularly limited to a YAG laser or argon laser oscillator, but a ruby laser, titanium sapphire laser, or other laser oscillator may be used provided that it is capable of generating a sum frequency laser beam by sum frequency mixture. Furthermore, the nonlinear crystal 1 is not limited to CLBO crystal, but BBO crystal ($BaB_2O_4$), LBO crystal ($LiB_3O_5$), or other crystal may be used provided that it is crystal capable of generating a sum frequency laser beam. Then, the light sensitive sensor 4 may be such that laser beam intensity can be monitored. For example, it may be a power meter which measures total energy received at a light receiving surface in the case where a photodiode is assumed as a light receiving element; or it may be a beam profiler in which a plurality of CCD sensors two-dimensionally regularly arranged are assumed as light receiving elements. Further, the laser device 100 is not also limited to a mask defect inspecting device if it is a device such that a laser beam is irradiated to the sample to be irradiated 6; for example, a semiconductor exposure device (stepper), optical disk device, length measurement device using laser interference, laser processing device, or other device may be used. Furthermore, here, a configuration which changes an optical path of the laser beam is used by providing the movable mirror 8 when the laser beam is irradiated to the sample to be irradiated; but, it is not necessarily limited to this configuration. For example, as a prior art, the laser beam may be separated for irradiating the sample and the light sensitive sensor 4 by using a fixed half mirror. Alternatively, it may be configured such that a movable type light sensitive sensor is inserted to an optical path of the laser beam only when the laser beam is monitored.

(Operation Method)

Figure 2:
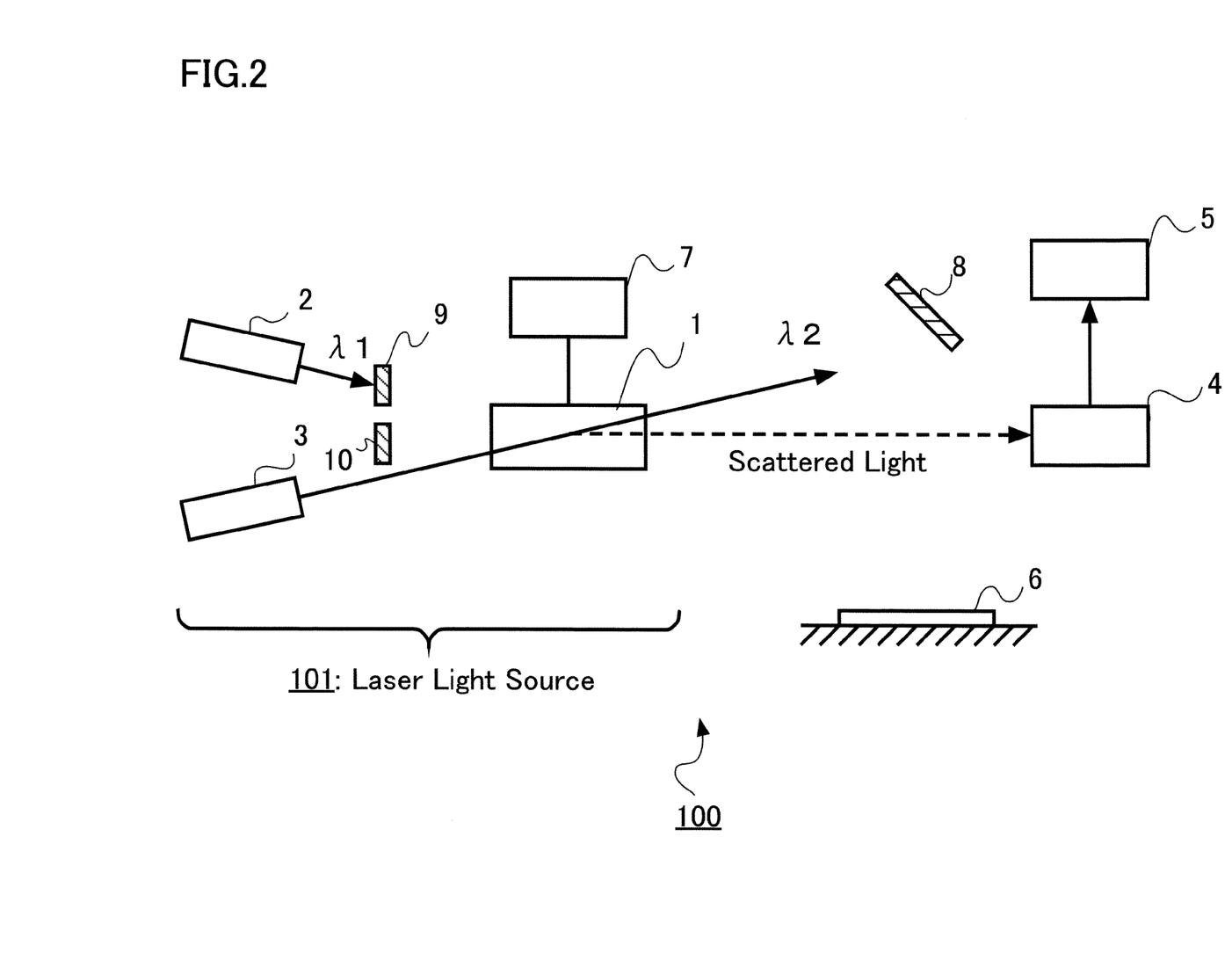
FIG. 2 is a view for explaining the operation method according to the first embodiment.

FIG. 2 is a view for explaining a method of operating a laser light source.

Stationary use (routine use of inspection, measurement, process, and the like by laser output beam irradiation to the sample to be irradiated 6) of the laser light source is intermitted with any interval in order to monitor a damage state of the nonlinear crystal 1. For example, intermittence for monitoring may be performed for every use, every several times to some dozen times, or every predetermined accumulated time of use of a laser light source.

When a damage state of the nonlinear crystal 1 is monitored, of two wavelength laser beams of the wavelength $\lambda 1$ and $\lambda 2$ to be input, here, one laser beam with the wavelength $\lambda 1$ is blocked by the first shutter 9. In this case, even when the laser beam of wavelength $\lambda 2$ is input to the nonlinear crystal 1, laser output beam of wavelength $\lambda 3$ of sum frequency is not generated; therefore, intensity of the beam to be input to the light sensitive sensor 4 provided on the optical axis of the laser output beam of $\lambda 3$ is generally zero. Naturally, the nonlinear crystal 1 is subject to damages due to light input/output during use of the laser light source or circumference moisture. Then, since damage of crystal is strain of a crystal lattice or noncrystallization of the crystal, scattered light is generated from the damaged part to its periphery when a laser beam of wavelength $\lambda 2$ is input to the damaged part. Therefore, this scattered light is also input to the light sensitive sensor 4. The scattered light intensity has a positive correlation with damage degree of the nonlinear crystal 1. Consequently, it becomes possible to judge movement time of the nonlinear crystal 1 by the judging circuit 5 based on a measurement value of the light sensitive sensor 4 by previously determining the scattered light intensity which shows limitation of damage degree of the crystal as a threshold.

Then, when the judging circuit 5 judges that it is a moving time of the nonlinear crystal 1, the position of the nonlinear crystal 1 is moved so that the two wavelength laser beams to be input are received at a non-damaged region of the crystal using the micromotion device 7. Then, in the case where a non-damaged region does not exist any more on the nonlinear crystal 1, the nonlinear crystal 1 is replaced.

Here, in the case where monitoring of the scattered light intensity is performed by only one wavelength laser beam, it is desirable to be performed by a shorter wavelength laser beam of two wavelengths because scattering is readily generated.

Furthermore, it is desirable that not only one laser beam but both wavelength scattered lights are alternatively monitored by the light sensitive sensor 4 and the movement time of the crystal is judged based on both measurement results, because information volume is increased and judgment accuracy is enhanced.

(Effects)

According to the present embodiment, damage judgment of the nonlinear crystal, whose accuracy has not been enhanced due to a scattered light in the known monitoring of the laser output beam, can be performed with higher accuracy by an operation method by which judgment is performed based on only scattered light intensity. Then, the laser beam can be supplied more stably compared to the prior art by moving the nonlinear crystal based on damaged judgment with high accuracy. Furthermore, since the light sensitive sensor which monitors intensity of the laser beam output from the laser light source is generally provided with a laser device, an additional light sensitive sensor need not be provided when the operation method according to the present embodiment is applied; therefore device configuration is not complicated.

Second Embodiment

Next, as a second embodiment according to the present invention, there will be described a method of operating a laser light source including a wavelength conversion device in which two wavelength laser beams are input to a nonlinear crystal to output a sum frequency wavelength, the method including: a step of automatically intermitting stationary use of the laser light source with any interval and inputting only one wavelength laser beam of the two wavelength laser beams to be input, to the nonlinear crystal; a step of measuring scattered light intensity of the one wavelength laser beam by a light sensitive sensor installed on an optical axis of the sum frequency wavelength output beam; a step of judging a damage state of the nonlinear crystal based on a measurement value obtained by the measurement of the scattered light; and a step of automatically moving the nonlinear crystal so that a laser beam to be input is received at a non-damaged region of the nonlinear crystal.

(Device Configuration)

Figure 3:
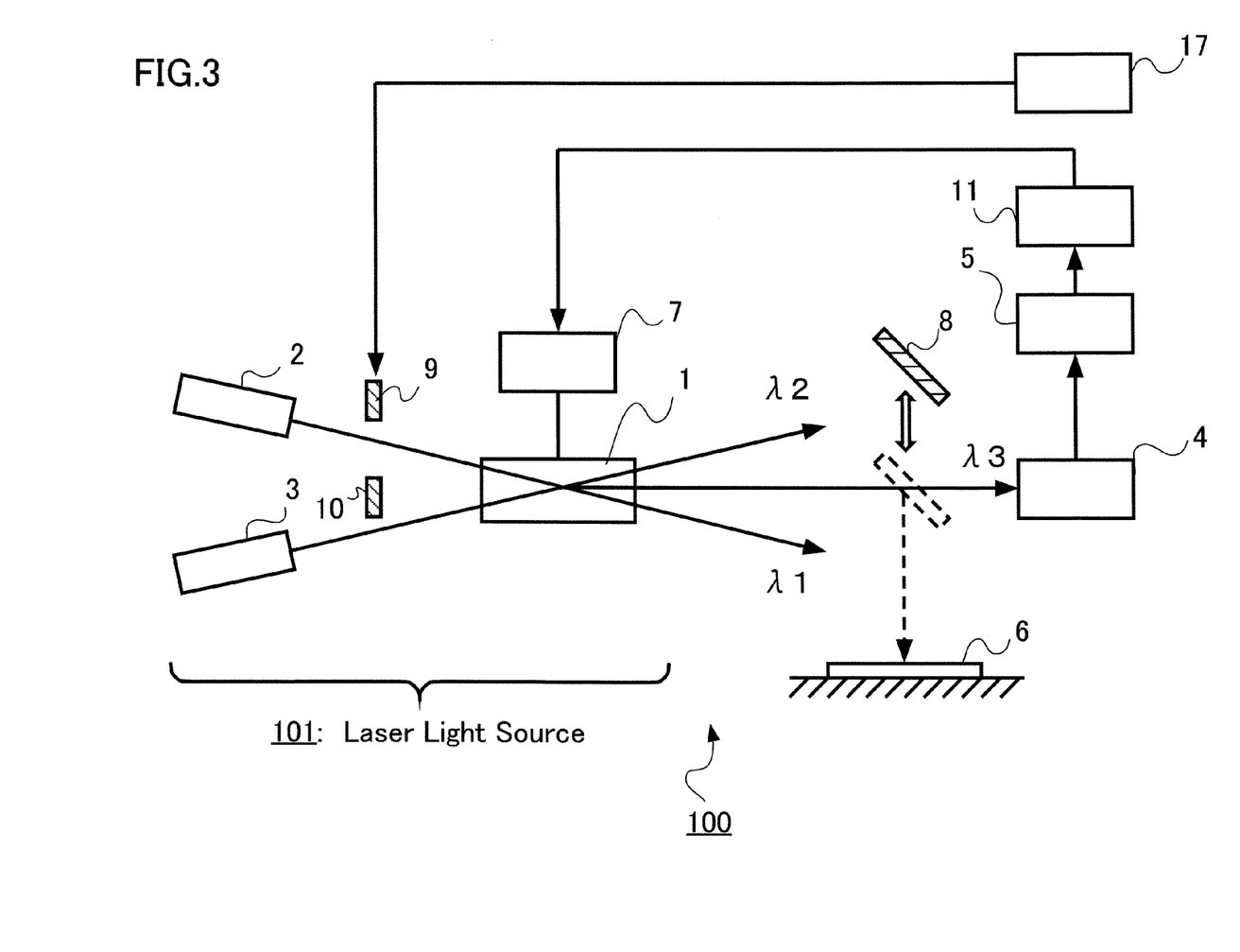
FIG. 3 is a conceptual view showing a configuration of a laser light source operated by an operation method according to a second embodiment and a laser device provided with the light source.

FIG. 3 is a conceptual view showing a configuration of a laser light source operated by an operation method according to the second embodiment and a laser device provided with the light source.

The difference from the first embodiment is in that there are included a micromotion device control circuit 11 which receives an input from the judging circuit 5 and automatically controls the micromotion device 7 and a shutter blocking circuit 17 which controls the first shutter 9 and the second shutter 10.

(Operation Method)

Stationary use (routine use of inspection, measurement, process, and the like by laser output beam irradiation to the sample to be irradiated 6) of the laser light source is intermitted with any interval in order to monitor a damage state of the nonlinear crystal 1. This intermittence is automatically performed with predetermined interval or timing. Then, when stationary use is intermitted for monitoring, the first shutter 9 is blocked by the shutter blocking circuit 17. After that, it is the same as in the first embodiment in that the movement time of the nonlinear crystal 1 is judged by the judging circuit 5 based on a measurement value from the light sensitive sensor 4. Here, in the case that it is judged as the movement time of the nonlinear crystal 1 by the judging circuit 5, its information is automatically input to the micromotion device control circuit 11. Then, the position of the nonlinear crystal 1 is automatically moved by the micromotion device 7 so that the laser input beam is received at a non-damaged region based on a signal output from the micromotion device control circuit 11. At this time, it is more preferable if an operation method is such that alarm of crystal replacement is automatically generated provided that the non-damaged region does not already remain on the nonlinear crystal 1.

(Effects)

In addition to the effects of the first embodiment, the stationary use is automatically intermitted and, in the case that it is judged as the movement time of the nonlinear crystal 1, the crystal is automatically moved; therefore, time loss is reduced compared to the case where an operator manually moves and it is possible to increase an operating rate.

Third Embodiment

Next, as a third embodiment according to the present invention, there will be described a method of operating a laser light source including a wavelength conversion device having a nonlinear crystal which is a wavelength conversion element and a heater which maintains the nonlinear crystal at a constant temperature, the method including: a step of measuring electric power supplied to the heater; and a step of judging a damage state of the nonlinear crystal based on a measurement value obtained by the measurement of the supplied electric power.

(Device Configuration)

Figure 4:
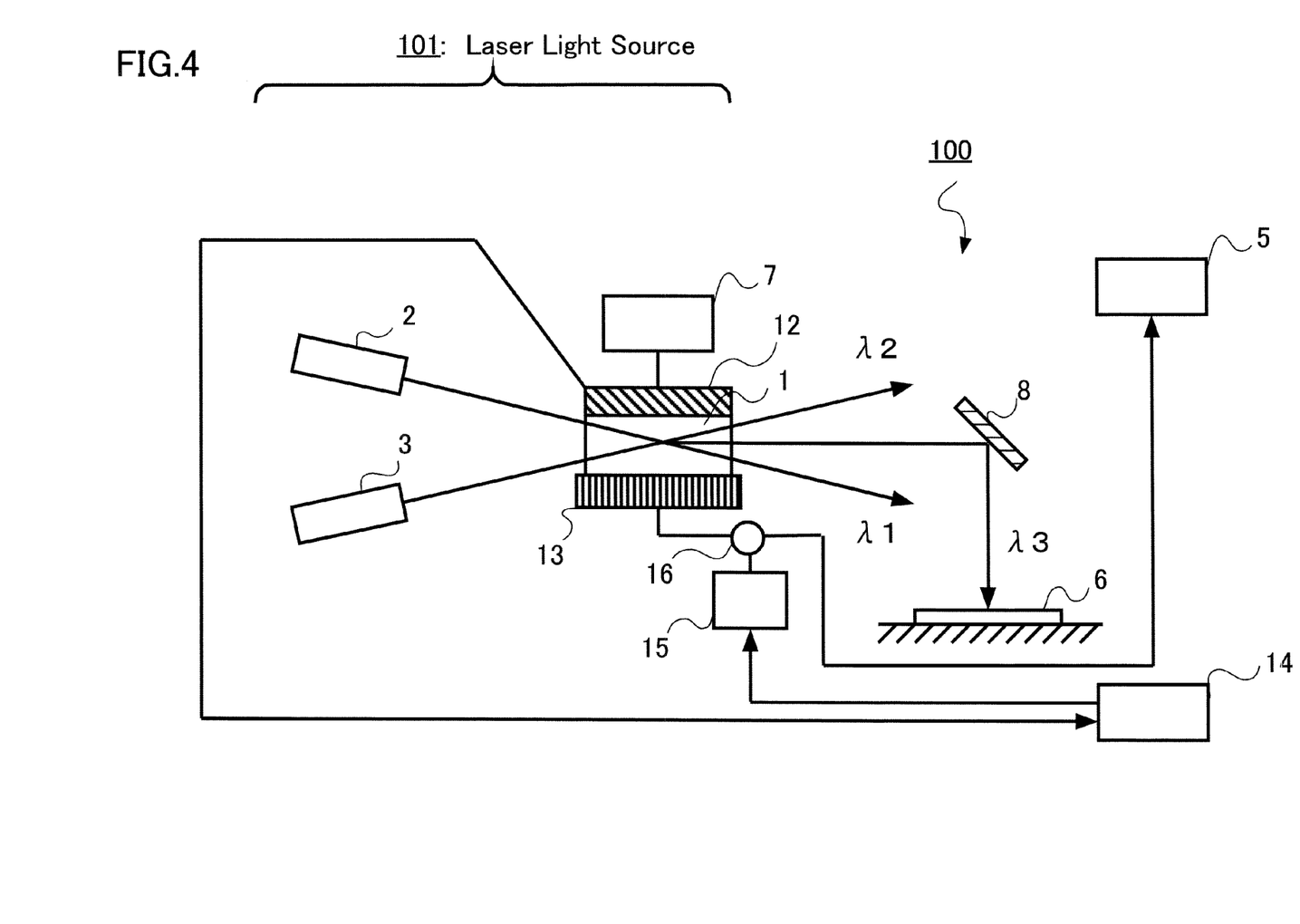
FIG. 4 is a conceptual view showing a configuration of a laser light source operated by an operation method according to a third embodiment and a laser device provided with the light source.

FIG. 4 is a conceptual view showing a configuration of a laser light source operated by an operation method according to the third embodiment and a laser device provided with the light source.

A laser device 100 according to the present embodiment includes a laser light source 101. The laser light source 101 includes a first laser oscillator 2 which generates a $\lambda 1$ wavelength laser beam, a second laser oscillator 3 which generates a $\lambda 2$ wavelength laser beam, a nonlinear crystal 1 which is a wavelength conversion element for generating a $\lambda 3$ wavelength laser beam by sum frequency mixture of the wavelengths $\lambda 1$ and $\lambda 2$, and a micromotion device 7 which moves the crystal when damage is produced on the nonlinear crystal 1. Further, in order to prevent the nonlinear crystal 1 from being damaged due to absorption of circumference moisture and to suppress fluctuation due to temperature, which is a laser beam characteristic, a heater 13 and a temperature sensor 12 are provided for maintaining the nonlinear crystal 1 at a constant temperature.

Furthermore, the laser device 100 according to the present embodiment, as a temperature maintenance mechanism of the nonlinear crystal 1, includes a temperature control circuit 14 which controls temperature of the heater 13 and a power supply 15 which is an electric power supply source to the heater 13 based on information from the temperature sensor 12. Furthermore, there are included a wattmeter 16 which monitors electric power supplied to a heater 13, a judging circuit 5 which judges a damage state of the nonlinear crystal based on a measurement value obtained from the wattmeter 16, a sample to be irradiated 6 to which the $\lambda 3$ laser beam output from the laser light source 101 is irradiated, and a mirror 8 which changes an optical path when the laser beam is irradiated to the sample to be irradiated 6.

In FIG. 4, component parts unnecessary for explaining the third embodiment are not shown. It goes without saying that the laser device 100 and the laser light source 101 generally include other necessary components.

Here, for example, if the first laser oscillator 2 uses a YAG laser oscillator in which neodymium serves as an active medium, oscillating at wavelength 1064 nm; and, the second laser oscillator 3 uses an argon laser oscillator which generates a harmonic two times of 244 nm; a laser beam output of a wavelength 198.5 nm can be obtained from the laser light source 101. Then, it is the same as in the first embodiment in that if such a laser beam in a deep ultraviolet region is used, it becomes possible to inspect a mask of 65 nm design rule product which is a next-generation semiconductor product, for example.

Here, the first laser oscillator 2 and second laser oscillator 3 are not particularly limited to a YAG laser or argon laser oscillator, but a ruby laser, titanium sapphire laser, or other laser may be used provided that it is capable of generating a sum frequency laser beam by sum frequency mixture. Furthermore, the nonlinear crystal 1 is not limited to CLBO crystal, but BBO crystal ($BaB_2O_4$), LBO crystal ($LiB_3O_5$), or other crystal may be used provided that it is crystal capable of generating a sum frequency laser beam. Then, although the electric power supplied to the heater 13 is monitored by the wattmeter 16, it is not necessarily limited to a wattmeter; but a measurement device such as an amperemeter may be used provided that electric energy supplied from the power supply 15 to the heater 13 can be monitored. Further, the laser device 100 is not also limited to a mask defect inspecting device as long as it is a device such that a laser beam is irradiated to the sample to be irradiated 6; for example, a length measurement device using laser interference, laser processing device, or other device may be used. Furthermore, here, a configuration which changes an optical path of the laser beam is used by providing the movable type mirror 8 when the laser beam is irradiated to the sample to be irradiated, but, it is not necessarily limited to this configuration. For example, the laser beam may be directly irradiated to the sample to be irradiated without bending the optical path or the optical path may be changed by a plurality of mirrors.

(Operation Method)

Figure 5:
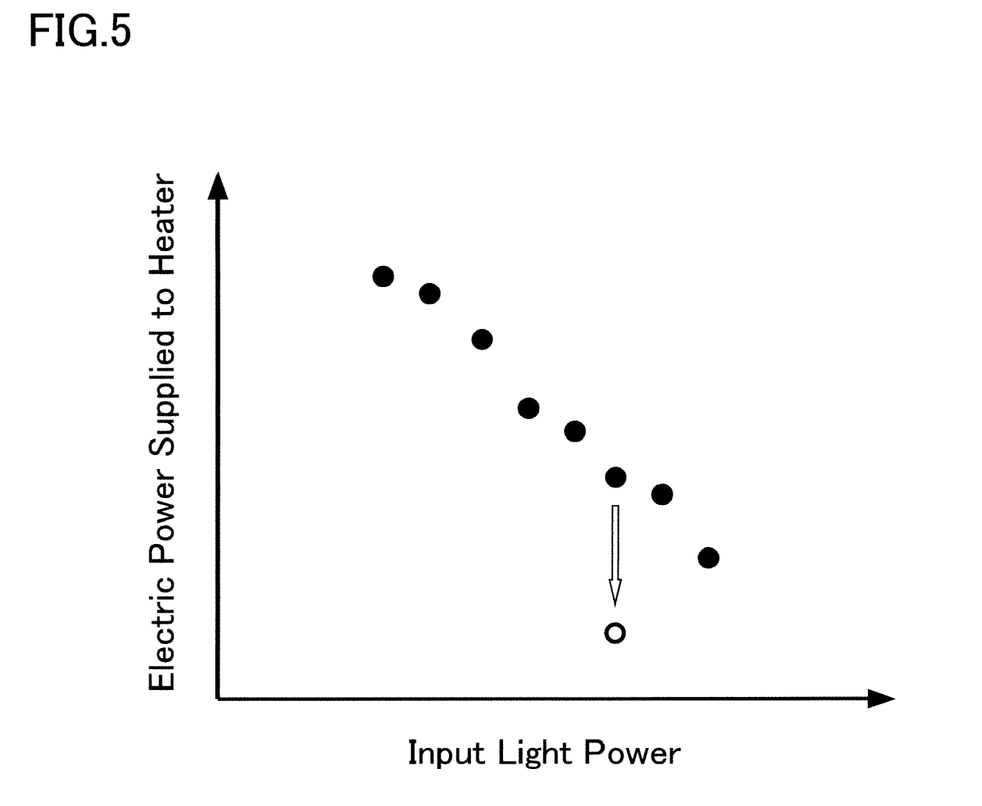
FIG. 5 is a view showing a relationship between input light and electric power supplied to a heater.

Generally, the nonlinear crystal 1 has a constant negative correlation between electric power supplied to the heater 15 and input light power because a part of the input light is converted to heat. FIG. 5 is a view showing a frame format of a relationship between input light power and electric power supplied to the heater in the case where one power of two wavelength laser beams to be input to the nonlinear crystal 1 is fixed and the other power is changed to control power of the laser output beam. Closed circles in the drawing show the relationship between the two in the case where damage is not generated in the nonlinear crystal 1. As is apparent from the drawing, when the power of the input light is increased, the supply of electric energy to the heater necessary for constantly maintaining temperature of the nonlinear crystal 1 is decreased. Naturally, if damage is produced on the nonlinear crystal 1 due to a long term use of the laser light source 101, light-heat conversion is generated more frequently than usual at the damaged part. Consequently, the electric power supplied to the heater 13 for maintaining the nonlinear crystal 1 at a constant temperature decreases; and, it deviates from the correlation in the case where damage is not generated on the nonlinear crystal 1 as shown by a open circle in FIG. 5.

In the operation method according to the present embodiment, calibration of the electric power supplied to the heater 13 necessary for maintaining the nonlinear crystal 1 at a constant temperature with respect to the power of the laser input beam to be used is performed in advance. Then, from the calibration, a threshold of the supplied electric power which is judged that the nonlinear crystal 1 is damaged to some degree to be moved, that is, a value which is judged that it significantly deviates from the correlation of the power of the input light and the electric power supplied to the heater is determined and input to the judging circuit 5 as a judgment threshold.

Then, electric power to be supplied from the power supply 15 to the heater during using the laser light source 101 is monitored by the wattmeter 16 and the measured value is compared with the threshold at the judging circuit 5, so that it is possible to judge a movement time of the nonlinear crystal 1 at the judging circuit 5. Then, if a movement time of the nonlinear crystal 1 is judged at the judging circuit 5, the nonlinear crystal 1 is moved using the micromotion device 7 to a position at which two wavelength laser beams to be input are received at a non-damaged region of the nonlinear crystal 1. Then, in the case where a non-damaged region does not exist any more on the nonlinear crystal 1, the nonlinear crystal 1 is replaced.

In addition, the judgment of the movement time of the nonlinear crystal 1 is not necessarily limited to a method based on deviance of the electric power supplied from correlation of one variable in which only power of the input light with a set temperature fixed serves as the variable; for example, in the case where a set temperature is tuned by a light receiving position of the crystal, a method based on deviance of the electric power supplied from correlation of two variables of power of the input light and a set temperature may be applied.

(Effects)

According to the present embodiment, judgment of damage of the nonlinear crystal, whose accuracy has not been enhanced due to a scattered light in the known monitoring of the laser output beam, can be performed with higher accuracy by an operation method by which judgment is performed based on fluctuation of electric power supplied to a heater. Then, the laser beam can be supplied more stably compared to the prior art by moving the nonlinear crystal based on the judgment of damage with high accuracy. Furthermore, since a damage state of the nonlinear crystal 1 can be monitored in a stationary use state, it is not necessary to particularly provide a time for monitoring and therefore efficient use of the device can be made. Further, at the application of the operation method of the present embodiment, since a temperature maintenance mechanism generally provided with a laser device is diverted, changes in new device configuration such as addition of a wattmeter and change in a judging circuit configuration are limited and therefore the device configuration is not complicated.

Variant of Third Embodiment

Next, as variant of a third embodiment, there will be described a case where an operation method which performs judgment of damage of a nonlinear crystal based on fluctuation of electric power supplied to a heater is applied to a laser light source which generates a harmonic.

(Device Configuration)

Figure 6:
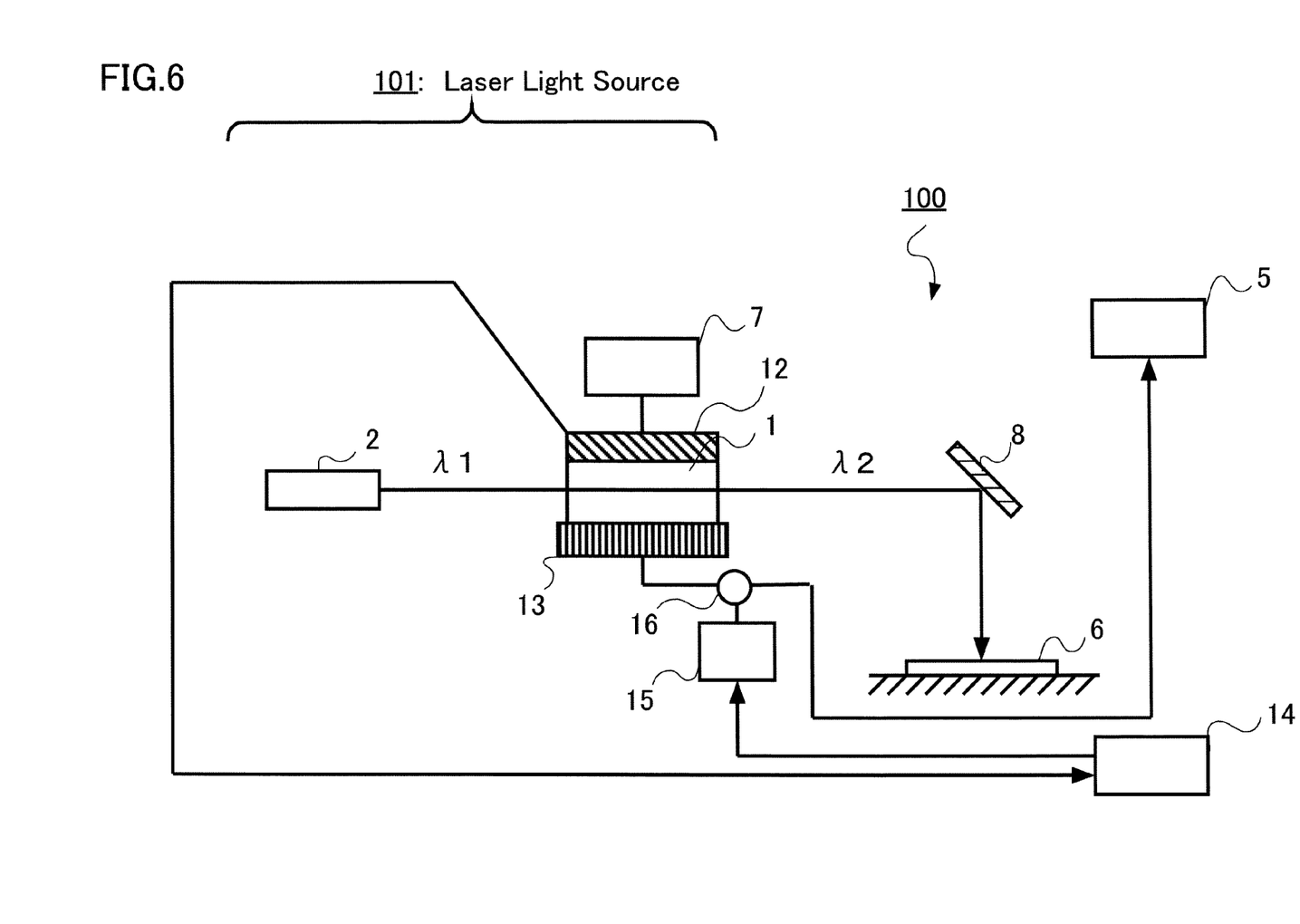
FIG. 6 is a conceptual view showing a configuration of a laser light source operated by an operation method according to a variant of the third embodiment and a laser device provided with the light source.

FIG. 6 is a conceptual view showing a configuration of a laser light source operated by an operation method according to a variant of the third embodiment and a laser device provided with the light source.

The configuration in which the laser light source uses a laser light source which generates a harmonic, is the same as in the third embodiment.

A laser light source 101 includes a first laser oscillator 2 which generates a $\lambda 1$ wavelength and a nonlinear crystal 1 which is a wavelength conversion element for generating a $\lambda 2$ wavelength laser beam.

Here, for example, the laser oscillator 2 uses a YAG laser oscillator in which neodymium serves as an active medium, oscillating at wavelength 1064 nm. Then, CLBO crystal ($CsLiB_6O_{10}$) is used as the nonlinear crystal 1 of the wavelength conversion element. Consequently, a laser beam output of a wavelength 532 nm ($=1/(1/1064+1/1064)$) can be obtained from the laser light source 101 as a second harmonic of a laser beam of a wavelength 1064 nm.

In addition, the laser oscillator 2 is not particularly limited to a YAG laser oscillator, but a ruby laser, titanium sapphire laser, or other laser may be used provided that it is capable of generating a harmonic laser beam by passage through the nonlinear crystal. Furthermore, a mode, in which a fundamental wave output from the laser oscillator 2 is converted to a harmonic and the converted harmonic is input to the nonlinear crystal 1 to be further converted to a short wavelength harmonic, may be used. Then, the nonlinear crystal 1 is not also limited to CLBO crystal, but BBO crystal ($BaB_2O_4$), LBO crystal ($LiB_3O_5$), or other crystal may be used provided that it is crystal capable of generating a harmonic laser beam.

(Operation Method)

An operation method of the variant according to the present embodiment is the same as in the third embodiment except that a laser beam to be passed through the nonlinear crystal 1 during calibration has only one wavelength.

(Effects)

According to the variant of the present embodiment, damage judgment of the nonlinear crystal, which is used for harmonic generation whose accuracy has not been enhanced due to a scattered light in the known monitoring of the laser output beam, can be performed with higher accuracy by an operation method by which judgment is performed based on fluctuation of electric power supplied to a heater. Then, the laser beam can be supplied more stably compared to the prior art by moving the nonlinear crystal based on a judgment of damage with high accuracy. In addition, it is the same as in the third embodiment in that effective use of the laser device can be made and the device configuration is not complicated.

Fourth Embodiment

Next, as a fourth embodiment according to the present invention, there will be described a method of operating a laser light source including a wavelength conversion device having a nonlinear crystal which is a wavelength conversion element and a heat-retention mechanism which maintains the nonlinear crystal at a constant temperature, the method including: a step of measuring input parameters to a heater of the heat-retention mechanism; a step of judging a damage state of the nonlinear crystal based on a measurement value obtained by the measurement; and a step of automatically moving the nonlinear crystal so that a laser beam to be input is received at a non-damaged region of the nonlinear crystal.

(Device Configuration)

Figure 7:
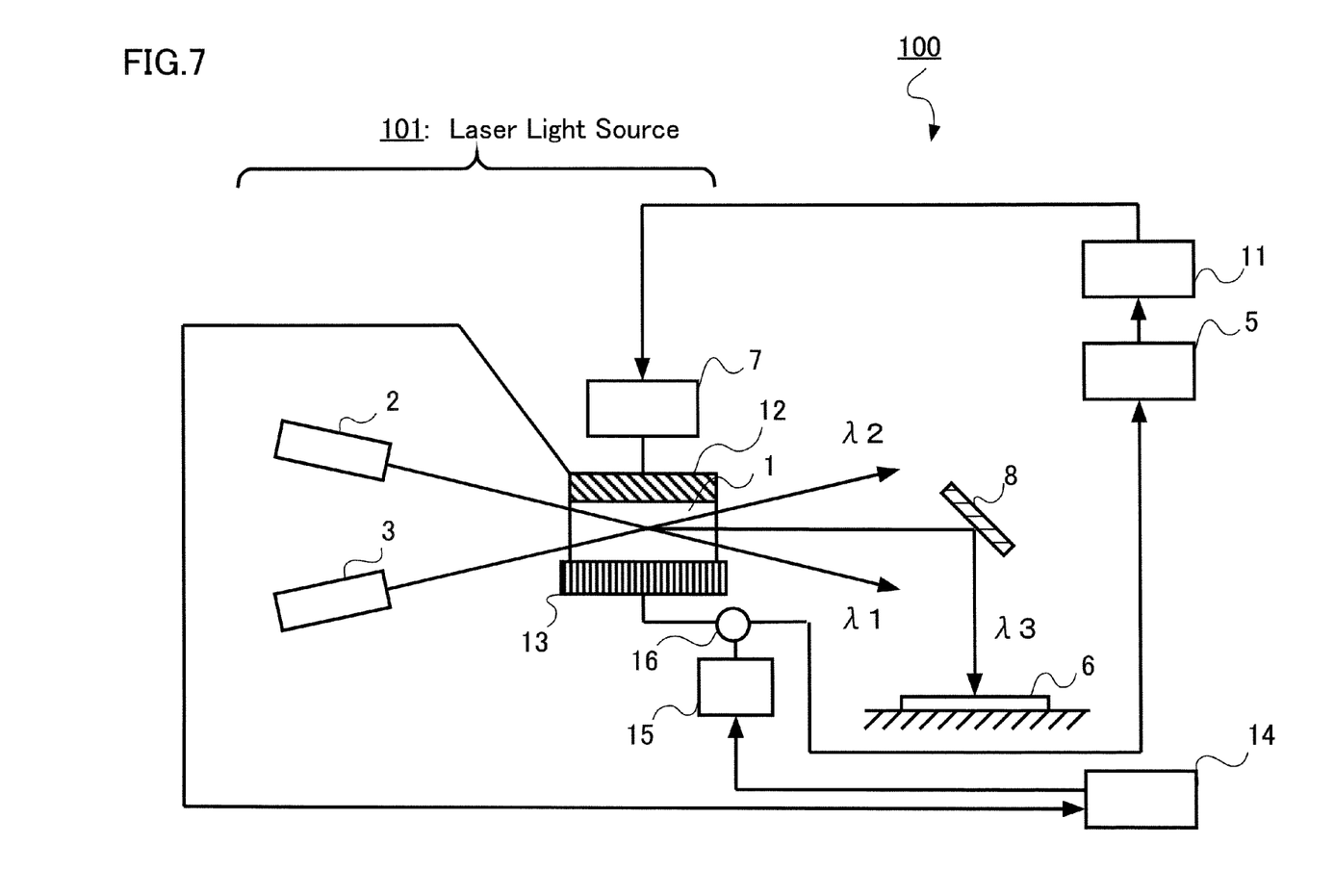
FIG. 7 is a conceptual view showing a configuration of a laser light source operated by an operation method according to a fourth embodiment and a laser device provided with the light source.

FIG. 7 is a conceptual view showing a configuration of a laser light source operated by an operation method according to the fourth embodiment and a laser device provided with the light source.

It differs from the third embodiment in that an input is received from the judging circuit 5 and the micromotion device control circuit 11 automatically controls the micromotion device 7.

In addition, although the laser light source 101 is a sum frequency in FIG. 7, the sum frequency is not necessarily used, but a harmonic may be used.

(Operation Method)

It is the same as in the first embodiment in that the movement time of the nonlinear crystal 1 is judged by the judging circuit 5 based on a measurement value from the wattmeter 16. Here, in the case that it is judged as the movement time of the crystal by the judging circuit 5, its information is automatically input to the micromotion device control circuit 11. Then, the nonlinear crystal is automatically moved by the micromotion device 7 to a position where the laser beam to be input is received at a non-damaged region of the nonlinear crystal 1 based on a signal output from the micromotion device control circuit 11. At this time, it is preferable that an alarm of crystal replacement is automatically generated when no non-damaged region remains on the nonlinear crystal 1.

(Effects)

In addition to the effects of the third embodiment, in the case that it is judged as the movement time of the nonlinear crystal 1, the crystal is automatically moved; therefore, time loss is reduced compared to the case where an operator manually moves the crystal and it is possible to increase an operating rate.

As shown above, the embodiments according to the present invention are described with reference to specific examples. In the description of the embodiments, elements or steps which are not directly required for the description of the present invention in the device configuration, control method, and the like are not explained. However, necessary device configuration and control method can be properly selected to be used.

Otherwise, all operation methods of laser light sources, in which elements of the present invention are included and designs are properly changed by those skilled in the art, are covered in the scope of the present invention.

What is claimed is:

1. A method of operating a laser light source including a wavelength conversion device in which two wavelength laser beams are input to a nonlinear crystal to output a sum frequency wavelength, the method comprising:

measuring light intensity of the sum frequency wavelength by a light sensitive sensor installed on an optical axis of the output sum frequency wavelength in an operation mode, periodically ceasing the operation mode and entering a judgment mode including, inputting only one wavelength laser beam of the two wavelength laser beams to the nonlinear crystal, measuring scattered light intensity of the one wavelength laser beam by the light sensitive sensor, and judging a damage state of the nonlinear crystal based on a measurement value obtained by the measuring.

2. A method of operating a laser light source according to claim 1, wherein the one wavelength laser beam has a shorter wavelength than the other.

3. A method of operating a laser light source including a wavelength conversion device in which two wavelength laser beams are input to a nonlinear crystal to output a sum frequency wavelength, the method comprising:

measuring light intensity of the sum frequency wavelength by a light sensitive sensor installed on an optical axis of the output sum frequency wavelength in an operation mode, periodically ceasing the operation mode and entering a judgment mode including, inputting only one wavelength laser beam of the two wavelength laser beams to the nonlinear crystal, measuring scattered light intensity of the one wavelength laser beam by the light sensitive sensor;

inputting only the other wavelength laser beam different from the one wavelength laser beam to the nonlinear crystal;

measuring scattered light intensity of the other wavelength laser beam by the light sensitive sensor; and judging a damage state of the nonlinear crystal based on both a measurement result of the scattered light intensity of the one wavelength laser beam and a measurement result of the scattered light intensity of the other wavelength laser beam.

4. A method of operating a laser light source according to claim 1, wherein the light sensitive sensor is a photodiode.

5. A method of operating a laser light source according to claim 1, wherein ceasing of the operation mode is performed in every predetermined accumulated time of use of the laser light source.

* * * * *